(12) United States Patent
Otto

(10) Patent No.: US 7,441,843 B2
(45) Date of Patent: Oct. 28, 2008

(54) HYDRAULIC UNIT

(75) Inventor: Albrecht Otto, Schöneck (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 246 days.

(21) Appl. No.: 10/572,122

(22) PCT Filed: Oct. 6, 2004

(86) PCT No.: PCT/EP2004/052423

§ 371 (c)(1),
(2), (4) Date: Mar. 16, 2006

(87) PCT Pub. No.: WO2005/047072

PCT Pub. Date: May 26, 2005

(65) Prior Publication Data

US 2007/0040445 A1 Feb. 22, 2007

(30) Foreign Application Priority Data

Oct. 10, 2003 (DE) ............... 103 47 147
Jun. 24, 2004 (DE) ............... 10 2004 030 625

(51) Int. Cl.
*B60T 8/36* (2006.01)
(52) U.S. Cl. .................. 303/119.3; 303/DIG. 10
(58) Field of Classification Search ......... 303/119.3, 303/DIG. 10; 137/884
See application file for complete search history.

(56) References Cited

U.S. PATENT DOCUMENTS 7,018,003 B2 * 3/2006 Otto et al. ............ 303/119.3
2004/0056529 A1 * 3/2004 Otto .................... 303/119.3
2007/0096553 A1 * 5/2007 May et al. ............ 303/119.3

FOREIGN PATENT DOCUMENTS

| DE | 19536847 | 4/1997 |
|----|----------|--------|
| DE | 19542582 | 5/1997 |
| DE | 19712211 | 10/1998 |
| DE | 19805843 | 5/1999 |

(Continued)

OTHER PUBLICATIONS

Patent Abstracts of Japan, vol. 2000, No. 25, Apr. 12, 2001, & JP 2001 2257736 A (Unisia Jecs Corp), Aug. 21, 2001.

(Continued)

*Primary Examiner*—Thomas J Williams

(57) ABSTRACT

A hydraulic unit for a slip-controlled brake system includes noise damping chambers (6), and at least one element which defines a direction of inflow and outflow of the pressure fluid for the throughflow and deviation of the pressure fluid in the noise damping chamber (6). In one embodiment, this is accomplished by two inclined channels (10, 11). An inclined channel (10) extends from a lateral surface of the accommodating member (1) through the wall of the pump bore (3), said inclined channel (10) opening at an acute angle in the area of the bottom of the noise damping chamber (6). Likewise, an additional inclined channel (11) extends from the lateral surface of the accommodating member (1) at an acute angle through the wall of the noise damping chamber 6, said inclined channel (11) opening in the bottom area of a valve accommodating bore (2) in the first valve row X.

5 Claims, 2 Drawing Sheets

FOREIGN PATENT DOCUMENTS

| | | |
|---|---|---|
| DE | 10228424 | 8/2003 |
| DE | 10355910 | 1/2005 |
| WO | 9712790 | 4/1997 |
| WO | 9925594 | 5/1999 |
| WO | 03064229 | 8/2003 |
| WO | WO 2003064229 A1 * | 8/2003 |
| WO | WO 2004110838 A1 * | 12/2004 |

OTHER PUBLICATIONS

Patent Abstracts of Japan, vol. 1996, No. 11, Nov. 29, 1996, & JP 08 188137 A (Unisia Jecs Corp), Jul. 23, 1996.

* cited by examiner

US 7,441,843 B2

HYDRAULIC UNIT

BACKGROUND OF THE INVENTION

The present invention relates to a hydraulic unit for a slip-controlled brake system with an accommodating member accommodating inlet and outlet valves in several valve accommodating bores of a first and a second valve row. The hydraulic unit has a pump bore which is arranged outside the two valve rows in the accommodating member and is aligned transversely to the direction of the valve accommodating bores opening into the accommodating member.

Two low-pressure accumulator bores open into the accommodating member outside the two valve rows and vertically to the axes of the valve accommodating bores and the pump bore. At least one hollow-cylinder-shaped noise damping chamber connected to the pump bore is arranged in parallel to the pump bore in a housing plane which is arranged in parallel to a housing plane that includes the valve accommodating bores. The hydraulic unit also includes several pressure fluid channels connecting the valve accommodating bores, pump bores and low-pressure accumulator bores and is adapted to establish a hydraulic connection between the brake pressure generator connections that open into the accommodating member and the wheel brake connections for the transport of pressure fluid.

A hydraulic unit of the type mentioned above is disclosed in DE 195 42 582 A1. It is proposed in this application to arrange the noise damping chamber in parallel to the pump bore in the accommodating member and to connect the pump bore to the noise damping chamber by way of a channel, to what end the channel opens radially into the wall of the noise damping chamber. To connect the noise damping chamber to at least one of the wheel brake connections of the accommodating member, an additional channel is provided which opens radially into the peripheral surface of the noise damping chamber and leads to at least one of the wheel brake connections.

The chosen arrangement of the channels impairs, however, complete rinsing of the noise damping chamber for the purpose of optimal bleeding.

In view of the above, an object of the invention is to improve a hydraulic unit of the mentioned type using means which are as simple as possible in such a manner that the shortcoming referred to hereinabove is overcome.

SUMMARY OF THE INVENTION

This object is achieved for a hydraulic unit of the indicated type by providing at least one element which brings about a defined direction of inflow and outflow of the pressure fluid for the throughflow and deviation of the pressure fluid in the noise damping chamber.

Further features, advantages, and possible applications of the invention will be explained in the following by way of the description of an embodiment.

DETAILED DESCRIPTION OF THE DRAWINGS

Figure 1:
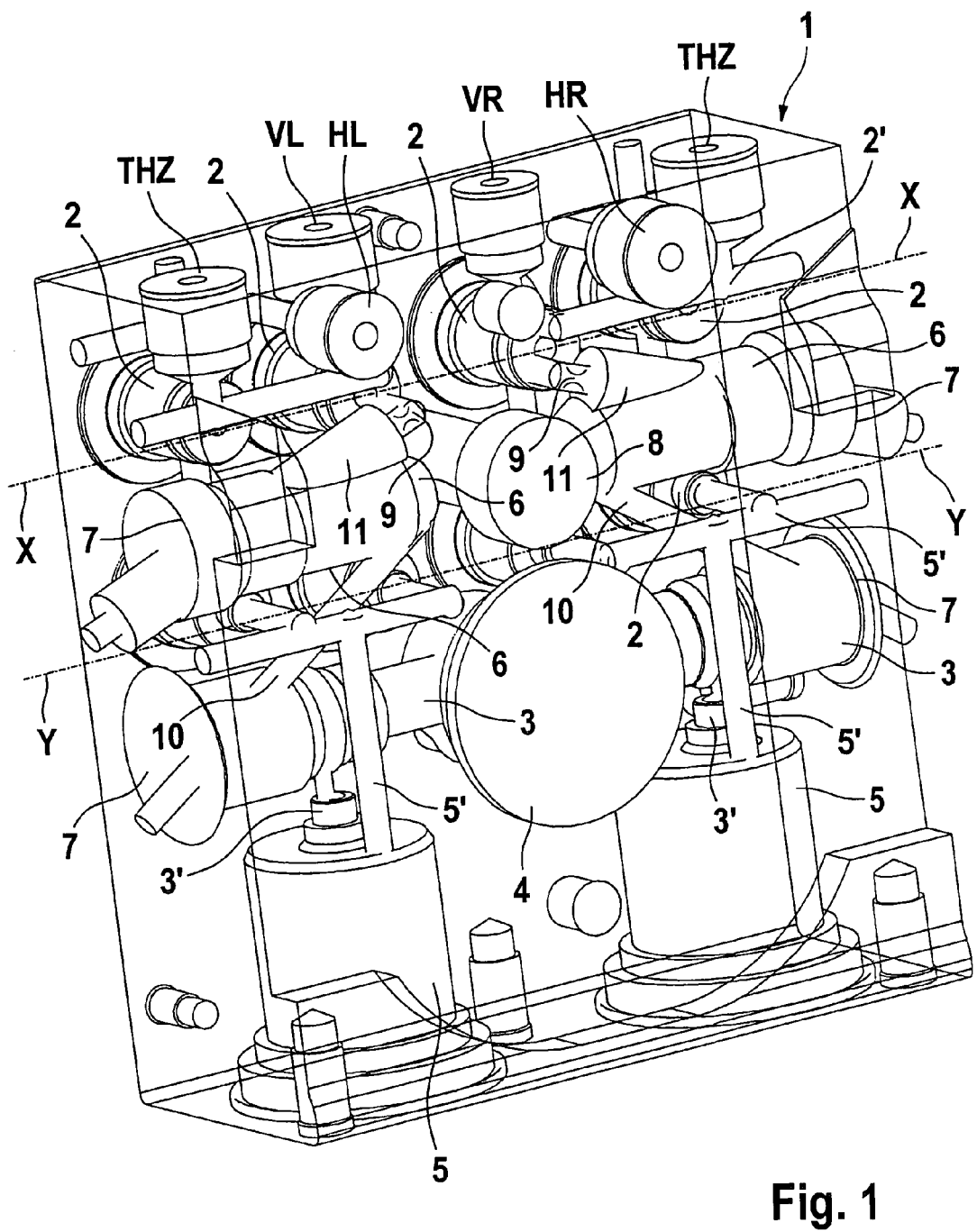
FIG. 1 is an overall perspective view of an accommodating member for a hydraulic unit.

FIG. 1 shows a perspective view of a hydraulic unit for a slip-controlled dual-circuit brake system, including a block-shaped accommodating member 1 which accommodates inlet an outlet valves in several valve accommodating bores 2 of a first and a second valve row X, Y and, beside the two valve rows X, Y, has a pump bore 3 which is aligned transversely to the direction of the valve accommodating bore 2 opening into the accommodating member 1. Arranged beside the two valve rows X, Y is also a motor accommodating bore 4 which opens vertically into a crank chamber that subdivides the pump bore 3 into two bore portions in order to accommodate two pump pistons. Remote from the two valve rows X, Y, two low-pressure accumulator bores 5 are additionally arranged in the accommodating member 1 and are directed into the accommodating member 1 beside the pump bore 3 vertically to the axes of symmetry of the valve accommodating bores 2 and vertically to the longitudinal axis of the pump bore 3. Several pressure fluid channels 2', 3', 5' which connect the valve accommodating bores 2, pump bores and low-pressure accumulator bores 3, 5 establish for each one of the two brake circuits a hydraulic connection between the two brake pressure generator connections THZ and the four wheel brake connections HR, HL, VR, VL.

The wheel brake connections HL, HR connected to the pressure fluid channels 2' by way of the valve accommodating bores 2 in the first valve row X are arranged in parallel to the motor accommodating bore 4 at the top side of the accommodating member 1 in an easy-to-mount way so that several tubes can be screwed without problems adjacent to a motor housing to be flanged to the motor accommodating bore 4 in an easily accessible fashion.

The second valve row Y comprises exclusively the valve accommodating bores 2 provided for the outlet valves, being positioned between the pump bore 3 and the first valve row X, which exclusively includes the valve accommodating bores 2 for the inlet valves. Especially short, straight pressure fluid channels 2' are achieved between especially one pair or valve accommodating bores 2 having an inlet and outlet valve in the valve rows X, Y for each wheel brake. By way of return channels 5' joined in pairs, an extremely simple connection between the valve accommodating bores 2 of the valve row Y and the two low-pressure accumulator bores 5 is achieved for each brake circuit.

The pump suction channel 3' arranged between the pump bore 3 and the low-pressure accumulator bore 5, on account of the above-mentioned block-type arrangement of the individual accommodating bores, is designed to be so short and, thus, extremely space-saving that it is still possible to optimally place therein a spring-loaded non-return valve (pump suction valve) which closes in each case in the direction of the low-pressure accumulator bore 5.

In addition, two hollow-cylinder-shaped noise damping chambers 6 which are configured as blind-end bores are provided beside the pump bore 3 for both brake circuits, said chambers being aligned axis parallel relative to the pump bore 3 and being connected to the pump bore 3 and the valve accommodating bores 2 of the first valve row X in the accommodating member 1 by way of special pressure fluid channels which will be described in detail in the following by way of FIG. 2.

Further, another through-opening 8 is disposed in the accommodating member 1 in a central position between the two valve rows X, Y in order to lead an electric plug that projects from the motor housing on the shortest way from the top side to the bottom side of the block-shaped accommodating member 1, with a view to connecting the plug for electrical contacting purposes to a valve control device attached to the bottom side of the accommodating member 1, the said valve control device additionally comprising the electronic control unit for driving the electric motor that is integrated in the motor housing.

The invention will be described in the following by way of FIG. 2, in which only one of the two noise damping chambers 6 is illustrated for the sake of clarity and will be explained in the following in connection with the essential features of the invention.

According to the invention, an inclined channel 10 extends from a lateral surface of the accommodating member 1 through the wall of the pump bore 3, said inclined channel 10 opening at an acute angle in the area of the bottom of the noise damping chamber 6. Likewise, an additional inclined channel 11 extends from the lateral surface of the accommodating member 1 at an acute angle through the wall of the noise damping chamber 6, said inclined channel 11 opening in the bottom area of a valve accommodating bore 2 in the first valve row X.

The two inclined channels 10, 11 represent the basic means bringing about a defined direction of inflow and outflow of the pressure fluid for a thorough throughflow and deviation of the pressure fluid in the noise damping chamber 6. Due to the direction of inflow predefined by the inclined channel 10, the pressure fluid supplied by the pump into the inclined channel 10 meets with the bottom of the noise damping chamber 6, where it is set upright and deviated by 180 degrees so that the course of flow subsequently takes place opposite to the inflow within the noise damping chamber 6 in the direction of the closure member 7 that is inserted into the noise damping chamber 6 at the lateral surface of the accommodating member 1. At the wall of the closure member, there is a new reversal of the flow in the opposite direction which corresponds to the direction of outflow of the additional inclined channel 11 so that thorough rinsing of the noise damping chamber 6 is achieved due to the course of flow just described. This rinsing process allows successfully preventing air bubbles from partly depositing in critical zones of the noise damping chamber 6.

Due to a suitable installation position of the hydraulic unit in the motor vehicle, the two inclined channels 10, 11 in the direction of throughflow are always aligned ascending to the brake pressure generator connections THZ arranged at the highest point of the accommodating member 1. As both inclined channels 10, 11 are configured as blind-end bores, they can be closed in a particularly simple fashion by means of the two closure members 7 inserted into the lateral surface of the accommodating member.

The inclined channel 10 penetrates the pump bore 3 downstream of a pump pressure valve inserted into the pump bore 3, while the so-called additional inclined channel 11 extends through the noise damping chamber 6 in the direction of a valve accommodating bore 2 arranged in the first valve row X. An orifice 9 is introduced into the noise damping chamber 6 in a comparatively simple fashion and inserted into the inclined channel 11 downstream of the noise damping chamber 6, with a view to achieving maximum effective noise damping. Downstream of the orifice 9, the inclined channel 11 ends as a short angular channel in the bottom of the valve accommodating bore 2.

Figure 2:
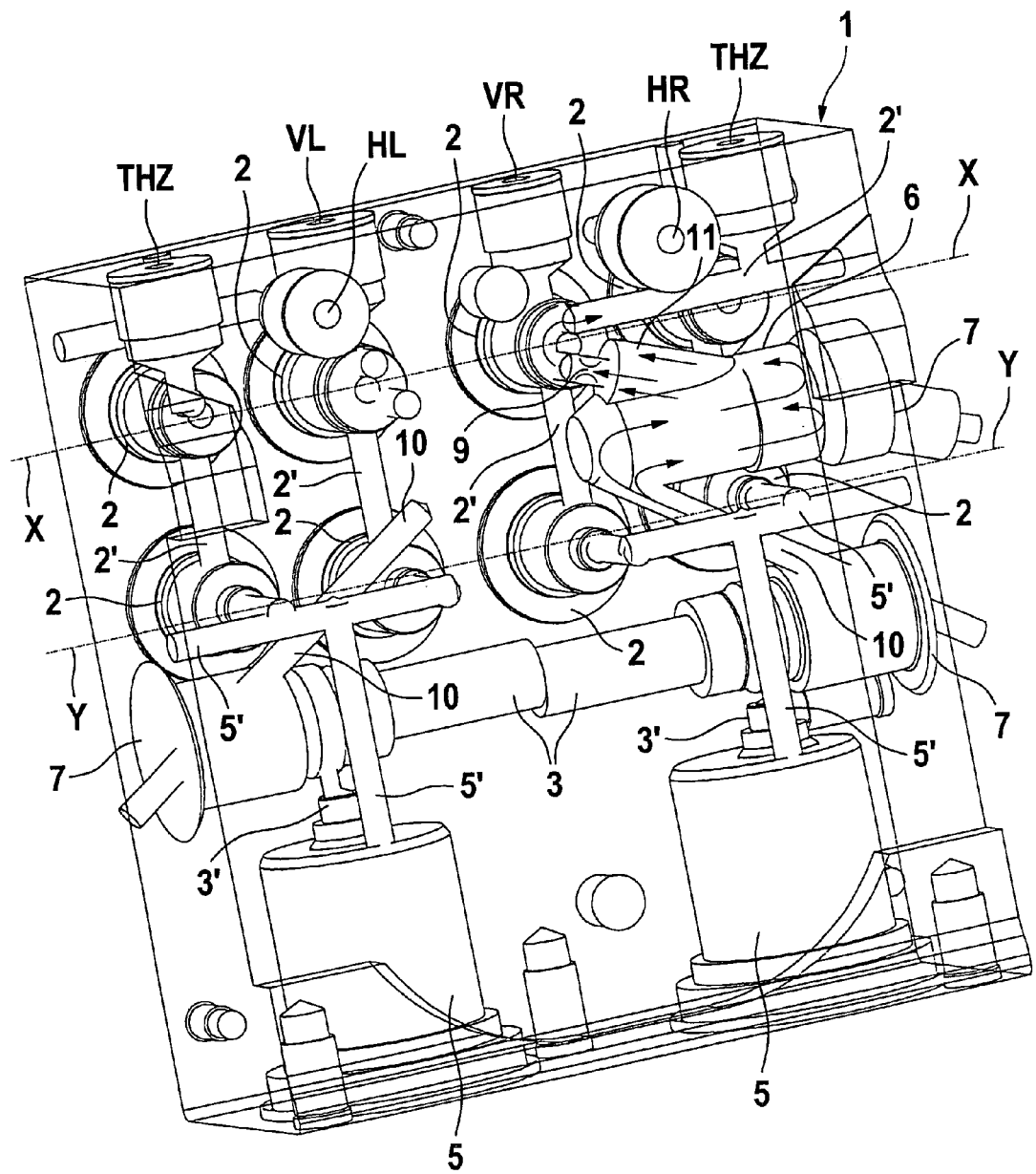
FIG. 2 is a partial perspective view of the accommodating member shown in FIG. 1 in order to illustrate the invention.

FIGS. 1 and 2 depict the advantages of the chosen block-type arrangement of bores in the accommodating member 1. The block-type arrangement of bores is optimized herein in such a fashion that only the pressure fluid channels 2', 5' provided for the valve rows X, Y are closed in a ball-type fashion, i.e. by means of appropriate sealing plugs, separately at the lateral surfaces of the accommodating member 1.

Compared thereto, the inclined channels 10, 11 are arranged in such a favorable manner that the above-mentioned ball-type closing arrangement is omitted. This is possible in a particularly simple way because the inclined channel 11 that extends from the noise damping chamber 6 to the first valve row X penetrates the peripheral surface of the noise damping chamber 6 in the direction of a valve accommodating bore 2 arranged in the first valve row X because of an inclined introduction of a drill into the noise damping chamber. Similarly, the drill is introduced into the pump bore 3 in such a way that it is possible to drill the inclined channel 10 through the peripheral surface of the pump bore 3 in the direction of the bottom of the noise damping chamber 6.

Due to the direct arrangement of the pump bore 3 between the low-pressure accumulator bores 5 and the second valve row Y, in addition, especially short pressure fluid channels 5', being optimized in terms of clearance volume, are achieved between the normally closed outlet valves of the second valve row Y via the low-pressure accumulator bores 5 to the pump bore 3, with the result that the evacuation and filling process is simplified which is necessary for the first filling of the hydraulic unit.

LIST OF REFERENCE NUMERALS 1 accommodating member
2 valve accommodating bore
2' pressure fluid channel
3 pump bore
3' pump suction channel
4 motor accommodating bore
5 low-pressure accumulator bore
5' pump suction channel
6 noise damping chamber
7 closure member
8 through-bore
9 orifice
10 inclined channel
11 inclined channel
X first valve row
Y second valve row
THZ brake pressure generator connection
HL, HR, VR, VL wheel brake connection

The invention claimed is:

1. A hydraulic unit for a slip-controlled brake system,
with an accommodating member accommodating inlet and outlet valves in several valve accommodating bores of a first and a second valve row,
with a pump bore which is arranged outside the two valve rows in the accommodating member and is aligned transversely to the direction of the valve accommodating bores opening into the accommodating member,
with two low-pressure accumulator bores opening into the accommodating member outside the two valve rows and opening into the accommodating member vertically to the axes of the valve accommodating bores and the pump bore,
with at least one hollow-cylinder-shaped noise damping chamber connected to the pump bore and being arranged in parallel to the pump bore in a housing plane which is arranged in parallel to a housing plane that includes the valve accommodating bores,
with several pressure fluid channels connecting the valve accommodating bores, pump bores and low-pressure accumulator bores and being adapted to establish a hydraulic connection between the brake pressure generator connection that opens into the accommodating member and the wheel brake connections for the transport of pressure fluid, wherein at least one element (10, 11) is provided which brings about a defined direction of inflow and outflow of the pressure fluid for the throughflow and deviation of the pressure fluid in the noise damping chamber (6), wherein the at least one element includes a first inclined channel (10) which extends from a lateral surface of the accommodating member (1) through the wall of the pump bore (3) in the area of the bottom of the noise damping chamber (6), and wherein the at least one element includes a second inclined channel (11) which extends from the lateral surface of the accommodating member (1) through the wall of the noise damping chamber (6), preferably at an acute angle, in the direction of a valve accommodating bore (2) in the first valve row (X) and opens in the bottom of the valve accommodating bore (2).

2. The hydraulic unit as claimed in claim 1,
wherein the two inclined channels (10, 11) in the direction of throughflow are always aligned ascending to the brake pressure generator connections (THZ) arranged at the highest point of the accommodating member (1).

3. The hydraulic unit as claimed in claim 2,
wherein both inclined channels (10, 11) are closed at the lateral surface of the accommodating member by means of two closure members (7) which also close the pump bore (3) and the noise damping chamber (6).

4. The hydraulic unit as claimed in claim 1,
wherein the additional inclined channel (11) is furnished with an orifice (9) which, downstream of the noise damping chamber (6), is inserted into the portion of the inclined channel (11) that is connected to the bottom of the valve accommodating bore (2).

5. The hydraulic unit as claimed in claim 1,
wherein the first inclined channel (10) penetrates the pump bore (3) downstream of a pump pressure valve inserted into the pump bore (3).

* * * * *